United States Patent
Chen et al.

(10) Patent No.: US 10,804,012 B1
(45) Date of Patent: *Oct. 13, 2020

(54) COMPOSITE CIRCUIT PROTECTION DEVICE

(71) Applicant: FUZETEC TECHNOLOGY CO., LTD., New Taipei (TW)

(72) Inventors: Jack Jih-Sang Chen, New Taipei (TW); Chang-Hung Jiang, New Taipei (TW)

(73) Assignee: FUZETEC TECHNOLOGY CO., LTD., New Taipei (TW)

(*) Notice: Subject to any disclaimer, the term of this patent is extended or adjusted under 35 U.S.C. 154(b) by 0 days.

This patent is subject to a terminal disclaimer.

(21) Appl. No.: 16/714,340

(22) Filed: Dec. 13, 2019

(51) Int. Cl.
*H01C 1/14* (2006.01)
*H02H 9/02* (2006.01)
*H01C 7/102* (2006.01)
*H01C 7/02* (2006.01)

(52) U.S. Cl.
CPC ........... *H01C 1/1406* (2013.01); *H01C 7/021* (2013.01); *H01C 7/102* (2013.01); *H02H 9/026* (2013.01)

(58) Field of Classification Search
CPC ...... H01C 1/1406; H01C 7/021; H01C 7/102; H01C 7/12
See application file for complete search history.

(56) References Cited

U.S. PATENT DOCUMENTS

| | | | | |
|---|---|---|---|---|
| 6,700,766 B2* | 3/2004 | Sato | ...... | H02H 9/042 361/93.1 |
| 8,446,245 B2* | 5/2013 | Wang | ...... | H01C 7/027 252/500 |
| 8,508,328 B1* | 8/2013 | Chen | ...... | H01C 7/028 338/13 |
| 10,418,158 B1* | 9/2019 | Chen | ...... | H01C 1/1406 |
| 2006/0197646 A1* | 9/2006 | Suzuki | ...... | H01C 7/027 337/167 |
| 2007/0025044 A1* | 2/2007 | Golubovic | ...... | H02H 9/042 361/124 |
| 2007/0170831 A1* | 7/2007 | Sato | ...... | H01C 1/1406 313/11 |
| 2015/0155080 A1* | 6/2015 | Chu | ...... | H01C 7/027 338/22 R |

* cited by examiner

*Primary Examiner* — Kyung S Lee
(74) *Attorney, Agent, or Firm* — Hamre, Schumann, Mueller & Larson, P.C.

(57) ABSTRACT

A composite circuit protection device includes a positive temperature coefficient (PTC) component, a voltage-dependent resistor, a first conductive lead and a second conductive lead. The PTC component includes a PTC polymeric layer, and first and second electrode layers respectively disposed on two opposite surfaces of the PTC polymeric layer. The voltage-dependent resistor is connected to the second electrode layer of the PTC component. The first and second conductive leads are respectively bonded to the first electrode layer of the PTC component and the voltage-dependent resistor. The PTC component has a rated voltage ranging between 40% and 200% of a varistor voltage of the voltage-dependent resistor.

19 Claims, 7 Drawing Sheets

COMPOSITE CIRCUIT PROTECTION DEVICE

FIELD

The disclosure relates to a composite circuit protection device, and more particularly to a composite circuit protection device having a positive temperature coefficient (PTC) component with a rated voltage that ranges between 40% and 200% of a varistor voltage of a voltage-dependent resistor as determined at 1 mA.

BACKGROUND

U.S. Pat. No. 8,508,328 B1 discloses an insertable polymer positive temperature coefficient (PPTC) over-current protection device that includes first and second electrodes 30, a solder material, conductive lead pins 50, 60 bonded to the first and second electrodes 30, respectively, and a PTC polymer matrix 20 laminated between the first and second electrodes 30 (see FIG. 1). The PTC polymer matrix 20 is formed with a hole 40 that has an effective volume to accommodate thermal expansion of the PTC polymer matrix 20 at increased temperature.

Figure 1:
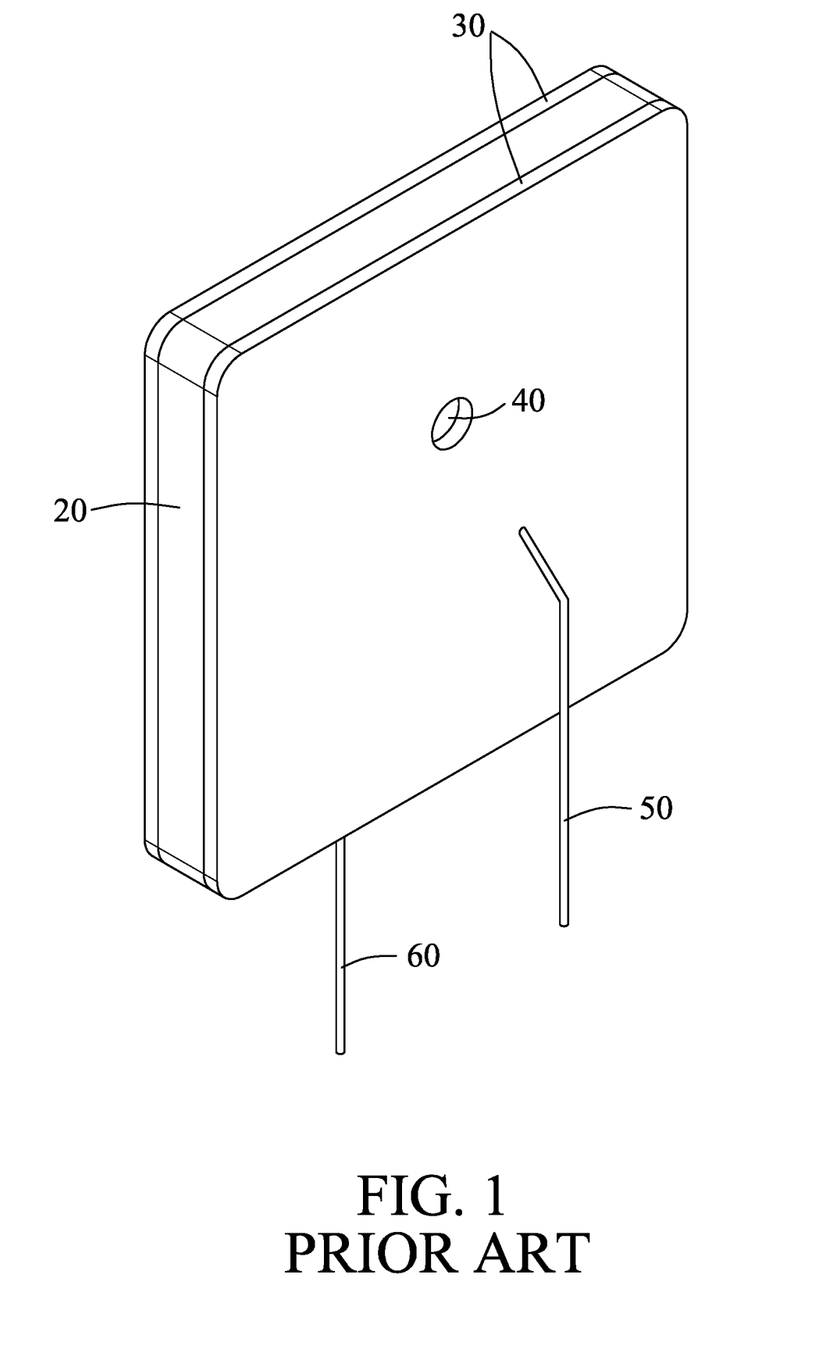
FIG. 1 is a perspective view of a conventional insertable PPTC over-current protection device.

Electrical properties (e.g., operating current and high-voltage surge endurability) are important factors which affect the occurrence of power surge in the PPTC over-current protection device. When the operating current of the PPTC over-current protection device is increased by increasing the thickness or the area of the PTC polymer matrix 20, the PPTC over-current protection device might become more vulnerable to power surge. On the other hand, when the high-voltage endurability of the PPTC over-current protection device is increased by decreasing the thickness or the area of the PTC polymer matrix 20, the PPTC over-current protection device is not necessarily less vulnerable to power surge.

Although a voltage-dependent resistor (VDR) could be combined with the PPTC component to impart over-current and over-voltage protection to the resultant composite circuit protection device, the VDR might only withstand power surge for short time period (such as 0.001 seconds). That is, if a time period of the power surge exceeds a cut-off time period, the VDR might be burned out or damaged due to over-current and over-voltage, causing permanent loss of function of the composite circuit protection device.

SUMMARY

Therefore, an object of the disclosure is to provide a composite circuit protection device that can alleviate at least one of the drawbacks of the prior art.

According to the disclosure, a composite circuit protection device includes a positive temperature coefficient (PTC) component, a voltage-dependent resistor, a first conductive lead and a second conductive lead. The PTC component includes a PTC layer having two opposite surfaces, and first and second electrode layers respectively disposed on the two opposite surfaces of the PTC layer. The voltage-dependent resistor is connected to the second electrode layer of the PTC component. The first conductive lead is bonded to the first electrode layer of the PTC component and the second conductive lead is bonded to the voltage-dependent resistor. The PTC component has a rated voltage that ranges between 40% and 200% of a varistor voltage of the voltage-dependent resistor as determined at 1 mA.

BRIEF DESCRIPTION OF THE DRAWINGS

Other features and advantages of the present disclosure will become apparent in the following detailed description of the embodiment with reference to the accompanying drawing, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
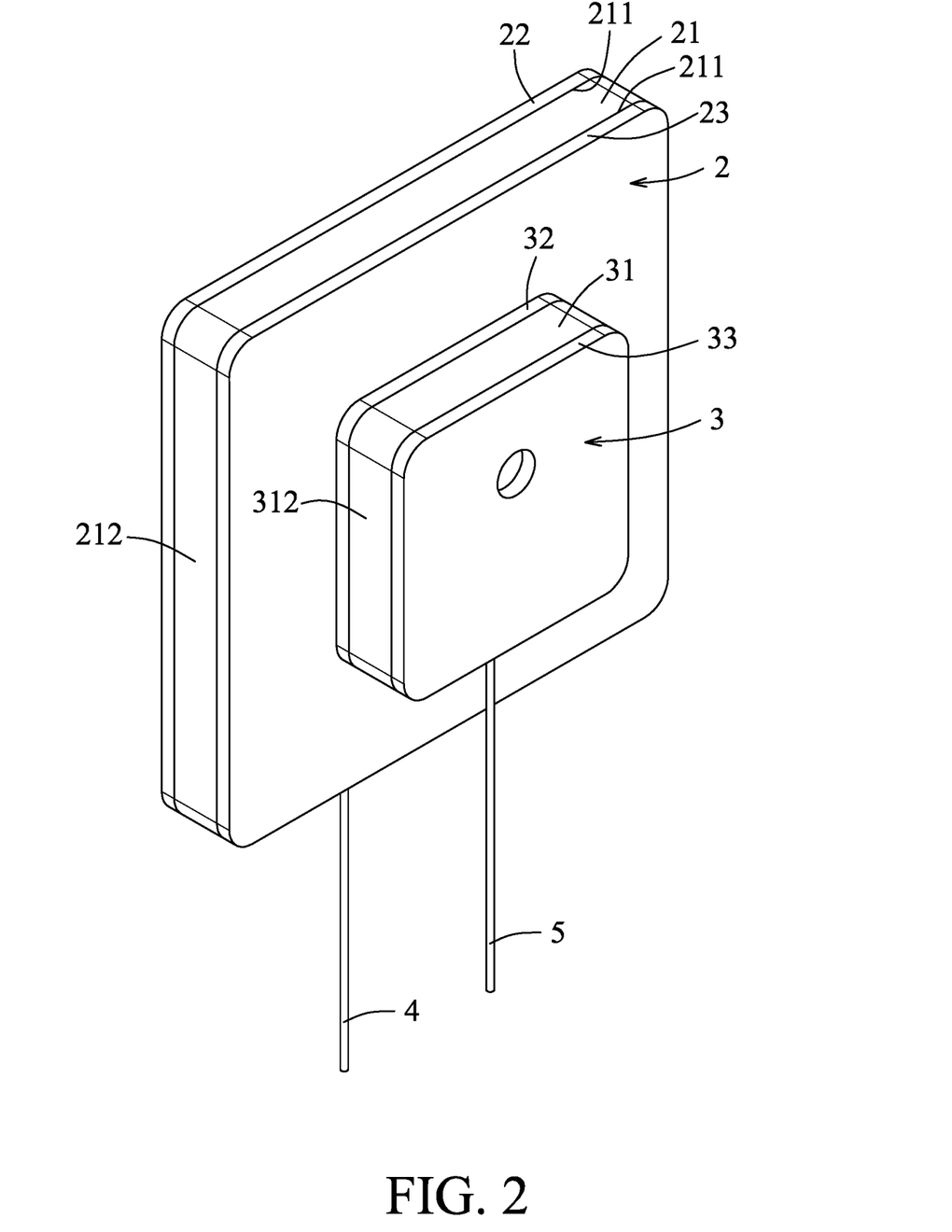
FIG. 2 is a perspective view of a first embodiment of a composite circuit protection device according to the present disclosure.
Figure 3:
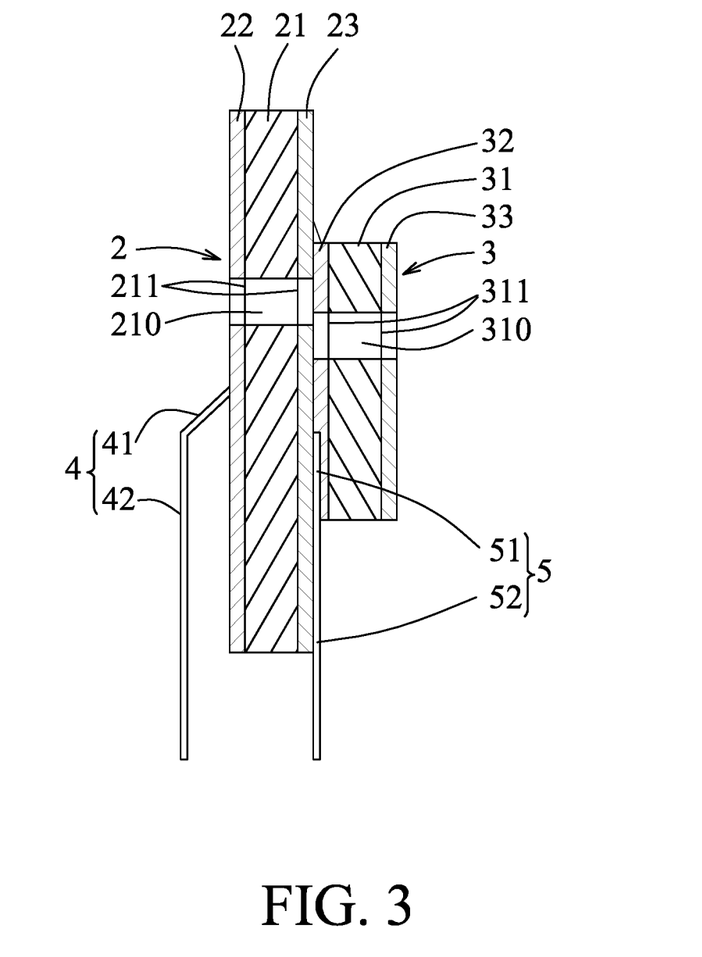
FIG. 3 is a schematic sectional view of the first embodiment.

Referring to FIGS. 2 and 3, a first embodiment of a composite circuit protection device according to the present disclosure includes a positive temperature coefficient (PTC) component 2, a voltage-dependent resistor 3, a first conductive lead 4 and a second conductive lead 5.

The PTC component 2 includes a PTC layer 21 having two opposite surfaces 211, and first and second electrode layers 22, 23 respectively disposed on the two opposite surfaces 211 of the PTC layer 21.

The voltage-dependent resistor 3 is connected to the second electrode layer 23 of the PTC component 2 through, e.g., a solder material.

The first conductive lead 4 is bonded to the first electrode layer 22 of the PTC component 2. The second conductive lead 5 is bonded to the voltage-dependent resistor 3.

The PTC component 2 has a rated voltage that ranges between 40% and 200% of a varistor voltage of the voltage-dependent resistor 3 as determined at 1 mA. In certain embodiments, the PTC component 2 has the rated voltage that ranges between 45% and 100% of the varistor voltage of the voltage-dependent resistor 3 as determined at 1 mA. In other embodiments, the PTC component 2 has the rated voltage that ranges between 45% and 70% of the varistor voltage of the voltage-dependent resistor 3 as determined at 1 mA.

According to this disclosure, the PTC component 2 trips before the voltage-dependent resistor 3 burns out in the presence of an over-current and a voltage that is greater than the varistor voltage of the voltage-dependent resistor 3. In other words, when the over-current and the voltage that is greater than the varistor voltage of the voltage-dependent resistor are present, the PTC component 2 quickly trips to a high resistance state, such that the over-current is restricted from flowing through the voltage-dependent resistor 3, thereby protecting the voltage-dependent resistor 3 from burning out. The composite circuit protection device can therefore be repeatedly used.

As used herein, the terms "burn out", "spark" and "fire" can be used interchangeably, and refer to the voltage-dependent resistor is out of function, which is typically occurred at a temperature of 180° C. or higher.

In certain embodiments, the PTC component 2 trips within $10^{-6}$ seconds to 100 seconds in the presence of the over-current that is greater than 0.1 A and a voltage that is greater than the varistor voltage of the voltage-dependent resistor 3. In other embodiments, the PTC component 2 trips within $10^{-5}$ seconds to 10 seconds in the presence of the over-current that is greater than 0.1 A and a voltage that is greater than the varistor voltage of the voltage-dependent resistor 3. In yet other embodiments, the PTC component 2 trips within $10^{-4}$ seconds to 1 second in the presence of the over-current that is greater than 0.1 A and a voltage that is greater than the varistor voltage of the voltage-dependent resistor 3.

In certain embodiments, the PTC component 2 trips within $10^{-3}$ seconds to 10 seconds in the presence of the over-current that is greater than 0.5 A and a voltage that is greater than the varistor voltage of the voltage-dependent resistor 3. In other embodiments, the PTC component 2 trips within $10^{-3}$ seconds to 1 second in the presence of the over-current that is greater than 0.5 A and a voltage that is greater than the varistor voltage of the voltage-dependent resistor 3.

In certain embodiments, the PTC component 2 trips within $10^{-3}$ seconds to 1 second in the presence of the over-current that is greater than 10 A and a voltage that is greater than the varistor voltage of said voltage-dependent resistor 3. In other embodiments, the PTC component 2 trips within $10^{-3}$ seconds to 0.1 second in the presence of the over-current that is greater than 10 A and a voltage that is greater than the varistor voltage of said voltage-dependent resistor 3.

The PTC component 2 may be formed with a first hole 210. In this embodiment, the first hole 210 is formed in the PTC layer 21. The PTC layer 21 of the PTC component 2 has a peripheral edge 212 that defines a boundary of the PTC layer 21 and interconnects the two opposite surfaces 211 of the PTC layer 21. The first hole 210 is spaced apart from the peripheral edge 212, and has an effective volume to accommodate thermal expansion of the PTC layer 21 at increased temperature, so as to avoid undesired structural deformation of the PTC layer 21.

In certain embodiments, the first hole 210 extends through at least one of the two opposite surfaces 211 of the PTC layer 21. In certain embodiments, the first hole 210 further extends through at least one of the first and second electrode layers 22, 23. In this embodiment, the first hole 210 extends through the two opposite surfaces 211 of the PTC layer 21 and the first and second electrode layers 22, 23, so as to form a through hole. In certain embodiments, the first hole 210 extends along a line passing through a geometrical center of the PTC layer 21 and is transverse to the opposite surfaces 211 of the PTC layer 21. The hole 210 is defined by a hole-defining wall having a cross section that may be parallel to the surface 211 of the PTC layer 21. The cross section of the hole-defining wall may be in a shape of circle, square, oval, triangle, crisscross, or etc.

According to this disclosure, the PTC component 2 may be a polymer positive temperature coefficient (PPTC) component, and the PTC layer 21 may be a PTC polymeric layer that includes a polymer matrix and a conductive filler dispersed in the polymer matrix. The polymer matrix may be made from a polymer composition that contains a non-grafted olefin-based polymer. In certain embodiments, the non-grafted olefin-based polymer includes high density polyethylene (HDPE). In certain embodiments, the polymer composition of the polymer matrix further includes a grafted olefin-based polymer. In certain embodiments, the grafted olefin-based polymer includes a carboxylic acid anhydride-grafted olefin-based polymer. Examples of the conductive filler suitable for use in this disclosure include, but are not limited to, carbon black powder, metal powder, electrically conductive ceramic powder, and combinations thereof.

According to this disclosure, the voltage-dependent resistor 3 may include a voltage-dependent resistor layer 31 having two opposite surfaces 311, and third and fourth electrode layers 32, 33. The second conductive lead 5 may be bonded to one of the third and fourth electrode layers 32, 33 of the voltage-dependent resistor 3. In certain embodiments, the voltage-dependent resistor layer 31 is made from a metal-oxide material.

In this embodiment, the third electrode layer 32 is disposed on one of the two opposite surfaces 311 of the voltage-dependent resistor layer 31 and is connected to the second electrode layer 23 of the PTC component 2. The fourth electrode layer 33 is disposed on the other one of the two opposite surfaces 311 of the voltage-dependent resistor layer 31. The second conductive lead 5 is bonded to and disposed between the second and third electrode layers 23, 32.

The voltage-dependent resistor 3 may be formed with a second hole 310 in the voltage-dependent resistor layer 31. In this embodiment, the voltage-dependent resistor layer 31 of the voltage-dependent resistor 3 has a peripheral edge 312 that defines a boundary of the voltage-dependent resistor layer 31 and interconnects the two opposite surfaces 311 of the voltage-dependent resistor layer 31. The second hole 310 is spaced apart from the peripheral edge 312 of the voltage-dependent resistor layer 31.

In certain embodiments, the second hole 310 extends through at least one of the two opposite surfaces 311 of the voltage-dependent resistor layer 31. In certain embodiments, the second hole 310 further extends through at least one of the third and fourth electrode layers 32, 33. In this embodiment, the second hole 310 extends through the two opposite surfaces 311 of the voltage-dependent resistor layer 31 and the third and fourth electrode layers 32, 33, so as to form a through hole.

According to the present disclosure, the first conductive lead 4 has a connecting portion 41 and a free portion 42, while the second conductive lead 5 has a connecting portion 51 and a free portion 52. The connecting portion 41 of the first conductive lead 4 is bonded to an outer surface of the first electrode layer 22 of the PTC component 2 through a solder material, and the free portion 42 extends outwardly from the connecting portion 41 beyond the first electrode layer 22 for insertion into a pin hole in a circuit board or a circuit device (not shown in the figures). In this embodiment, the connecting portion 51 of the second conductive lead 5 is bonded to and disposed between the second and third electrode layers 23, 32 through a solder material, and the free portion 52 extends outwardly from the connecting portion 51 beyond the second and third electrode layers 23, 32 for insertion into a pin hole in a circuit board or a circuit device (not shown in the figures).

Figure 4:
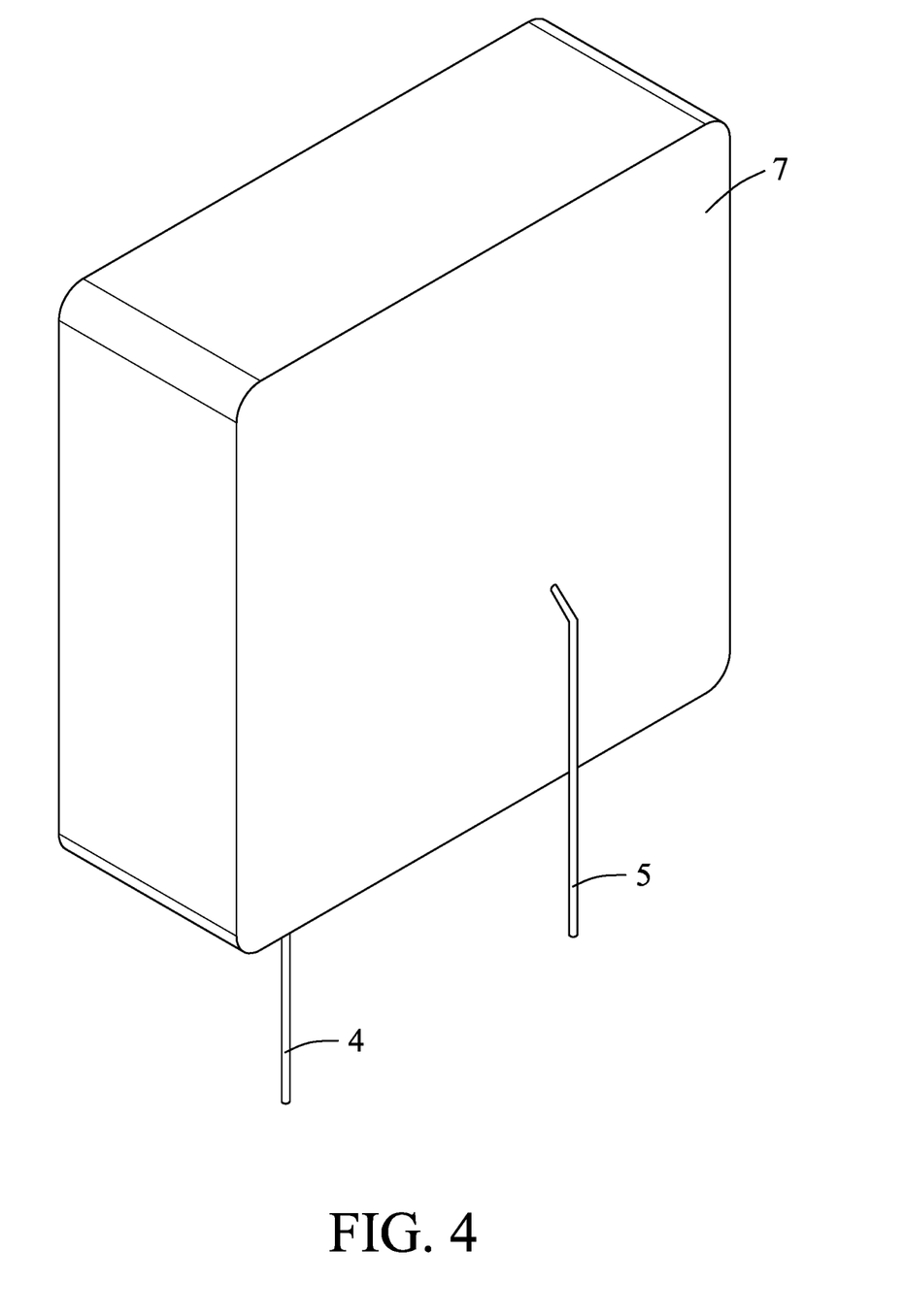
FIG. 4 is a perspective view of a second embodiment of a composite circuit protection device according to the present disclosure.
Figure 5:
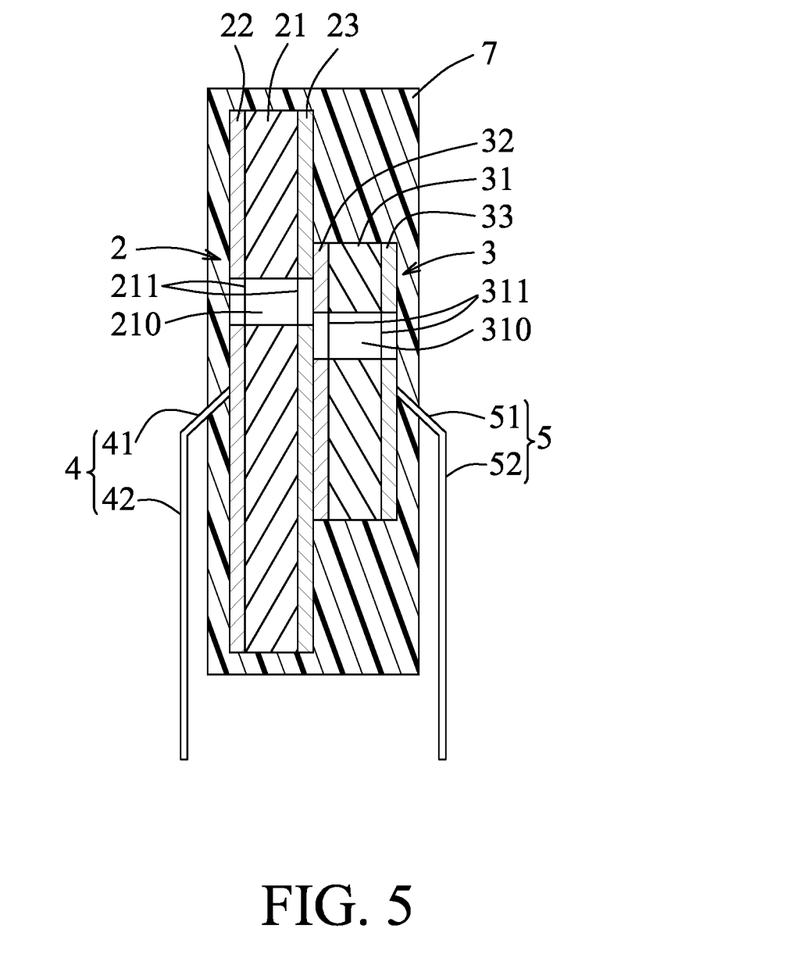
FIG. 5 is a schematic sectional view of the second embodiment.

Referring to FIGS. 4 and 5, a second embodiment of a composite circuit protection device according to the present disclosure is similar to the first embodiment. The difference resides in that, in the second embodiment, the connecting portion 51 of the second conductive lead 5 is bonded to an outer surface of the fourth electrode layer 33 of the voltage-dependent resistor 3 through a solder material, and the free portion 52 extends outwardly from the connecting portion 51 beyond the fourth electrode layer 33 for insertion into a pin hole in a circuit board or a circuit device (not shown in the figures). In addition, the second embodiment further includes an encapsulant 7 that encloses the PTC component 2, the voltage-dependent resistor 3, a part of the first conductive lead 4 and a part of the second conductive lead 5. The free portions 42, 52 of the first and second conductive leads 4, 5 are exposed from the encapsulant 7. In certain embodiments, the encapsulant 7 is made from epoxy resin.

Figure 6:
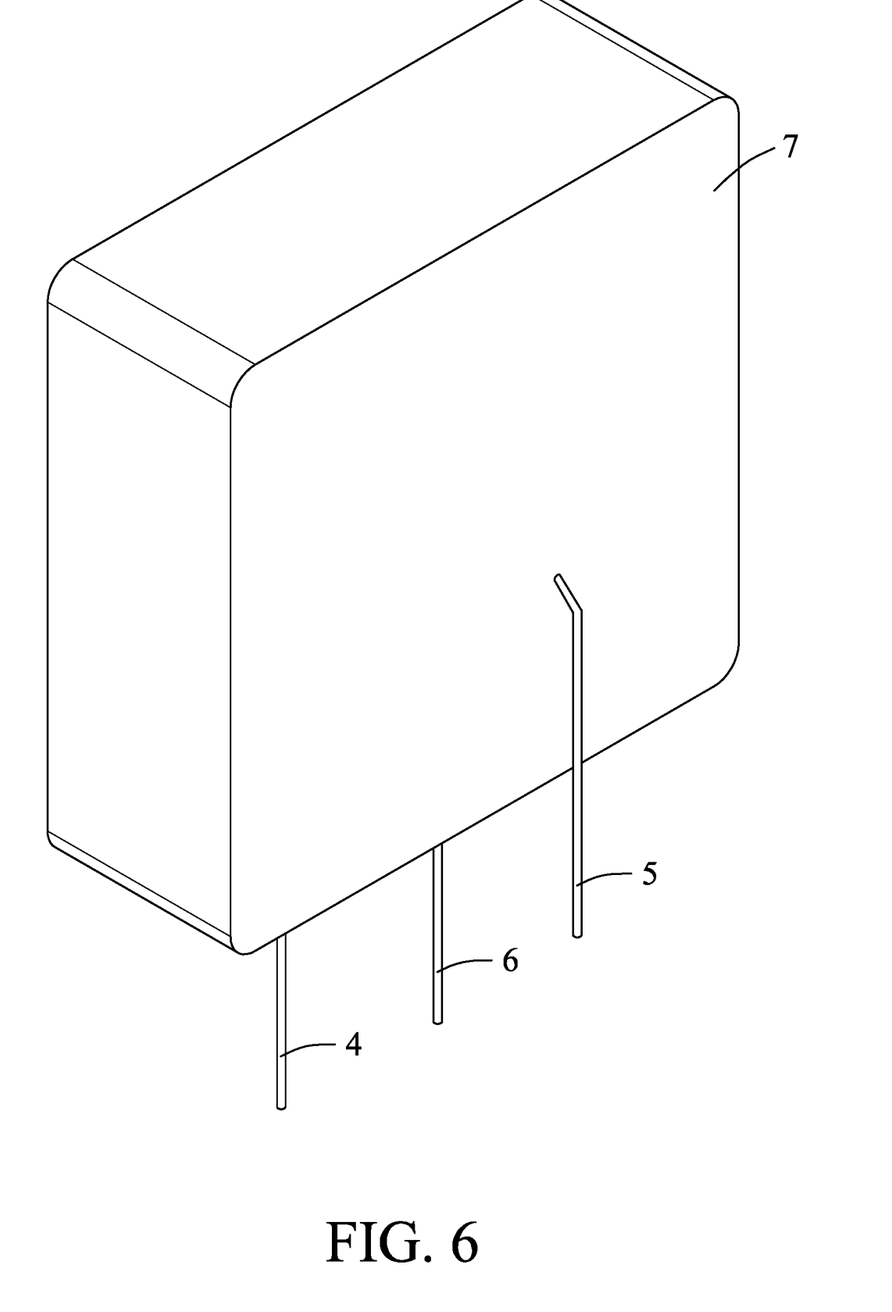
FIG. 6 is a perspective view of a third embodiment of a composite circuit protection device according to the present disclosure.
Figure 7:
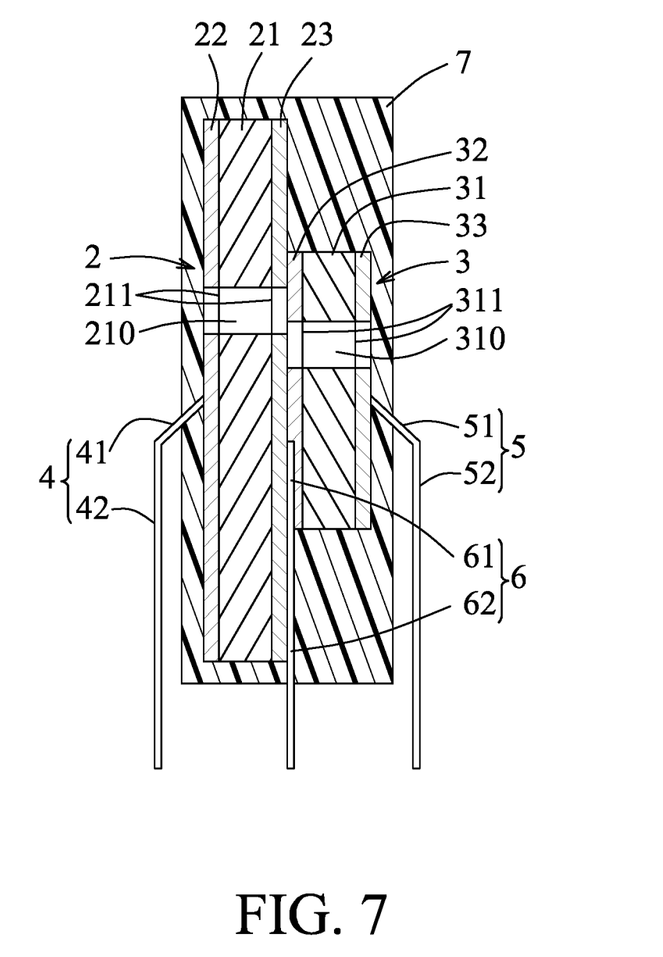
FIG. 7 is a schematic sectional view of the third embodiment.

Referring to FIGS. 6 and 7, a third embodiment of a composite circuit protection device according to the present disclosure is similar to the second embodiment, except that the third embodiment further includes a third conductive lead 6. The third conductive lead 6 is bonded to and disposed between the second and third electrode layers 23, 32. The third conductive lead 6 has a connecting portion 61 that is connected to the second and third electrode layers 23, 32, and a free portion 62 that extends outwardly from the connecting portion 61 beyond the second and third electrode layers 23, 32 for insertion into a pin hole in a circuit board or a circuit device (not shown in the drawings).

In this embodiment, the encapsulant 7 encloses the PTC component 2, the voltage-dependent resistor 3, a part of the first conductive lead 4, a part of the second conductive lead 5, and a part of the third conductive lead 6. The free portions 42, 52, 62 of the first, second and third conductive leads 4, 5, 6 are exposed from the encapsulant 7.

The disclosure will be further described by way of the following examples and comparative examples. However, it should be understood that the following examples are solely intended for the purpose of illustration and should not be construed as limiting the disclosure in practice.

EXAMPLES

Example 1 (E1)

21 grams of HDPE (purchased from Formosa Plastics Corp., catalog no.: HDPE9002) serving as the non-grafted olefin-based polymer, 21 grams of maleic anhydride grafted HDPE (purchased from Dupont, catalog no.: MB100D) serving as the carboxylic acid anhydride-grafted olefin-based polymer and 58 grams of carbon black powder (purchased from Columbian Chemicals Co., catalog no.: Raven 430UB) serving as the conductive filler were compounded in a Brabender mixer. The compounding temperature was 200° C., the stirring rate was 30 rpm, and the compounding time was 10 minutes.

The resultant compounded mixture was hot pressed in a mold under 200° C. and 80 kg/cm² for 4 minutes so as to form a thin sheet of the PTC polymeric layer. Two copper foil sheets (serving as the first electrode layer and the second electrode layer, respectively) were respectively attached to the two opposite surfaces of the PTC polymeric layer and were hot pressed under 200° C. and 80 kg/cm² for 4 minutes so as to form a polymer positive temperature coefficient (PPTC) component. The PPTC component was cut into a plurality of PPTC chips (PPTC-1) with a size of 9.5 mm×11.5 mm and a thickness of 0.42 mm. Each PPTC chip was irradiated with a Cobalt-60 gamma ray for a total irradiation dose of 150 kGy. First and second conductive leads were then respectively welded to the two copper foil sheets of each PPTC chip, followed by welding of a metal-oxide varistor (MOV) (Ceramate Technical Co., Ltd., Model No: 07D270K, abbreviated as MOV-1), i.e., a type of a voltage-dependent resistor, to one of the copper foil sheets of the PPTC chip, so as to form a composite circuit protection device of E1.

The PPTC chip was subjected to determination of a hold current (i.e., a maximum current value which can be applied in normal operation), a trip current (i.e., a minimum current value which is necessary for the PPTC component to achieve a high-resistance state), a rated voltage (i.e., a voltage at which the PPTC component is designed to work with) and a withstand voltage (i.e., a maximum voltage limit which will not cause the PPTC component to be malfunctioned or damaged) according to the Underwriter Laboratories UL 1434 Standard for Safety for Thermistor-Type Devices. In addition, the MOV-1 were subjected to determination of a varistor voltage (i.e., a voltage at which the MOV component is designed to work with) and a clamping voltage (i.e., a maximum voltage that can pass the MOV component before it restricts further voltage from passing to the test device) according to the Underwriter Laboratories UL 1449 Standard for Safety for Transient Voltage Surge Suppressors. The characteristic results are shown in Table 1.

TABLE 1

|  | Hold current | Trip current | Rated voltage | Withstand voltage |
|---|---|---|---|---|
| PPTC-1 | 5.00 A | 8.50 A | 16 V | 16 V |
|  |  |  | Varistor voltage[a] | Clamping Voltage[b] |
| MOV-1 | — | — | 27 V | 53 V |

— Not Applicable
[a]determined at 1 mA
[b]determined at a test pulse waveform ($t_p$) = 8/20 μs and a test pulse current (IP) = 2.5 A Examples 2 to 4 (E2 to E4)

The procedures and conditions in preparing the composite circuit protection devices of E2 to E4 were similar to those of E1, except that the PPTC chip is formed with a first through hole and/or the MOV is formed with a second through hole (see Table 3), each of the first and second through-holes being defined by a hole-defining wall with a circular cross section that has a diameter (d) of 1.5 mm and an area ($\pi d^2/4$) of 1.77 mm².

To be specific, in E2, after irradiating with the Cobalt-60 gamma ray, a central portion of each PPTC chip was punched to form the first through-hole. In E3, before welding to one of the copper foil sheets of the PPTC chip, a central portion of the MOV was punched to form the second through-hole. In E4, a central portion of each PPTC chip was punched to form the first through-hole and a central portion of the MOV was punched to form the second through-hole as shown in FIG. 3.

Comparative Examples 1 to 4 (CE1 to CE4)

The procedures and conditions in preparing the composite circuit protection devices of CE1 to CE4 were respectively similar to those of E1 to E4, except that the PPTC chip was not included in CE1 and CE2, and the MOV was not included in CE3 and CE4.

Examples 5 to 8 (E5 to E8)

The procedures and conditions in preparing the composite circuit protection devices of E5 to E8 were respectively similar to those of E1 to E4, except that, in E5 to E8, the formulation of the compounded mixture used for forming the PTC polymeric layer includes 10 grams of HDPE, 10 grams of maleic anhydride grafted HDPE, 15 grams of carbon black powder, and 15 grams of magnesium hydroxide (MagChem® MH 10), and each PPTC chip (PPTC-2) thus prepared is in circular form having a diameter of 3.1 mm and a thickness of 2.2 mm. In addition, the MOV used in E5 to E8 was purchased from Ceramate Technical Co., Ltd. (Model No: 20D361K) (abbreviated as MOV-2). The characteristics of PPTC-2 and the MOV-2 are shown in Table 2.

TABLE 2

|  | Hold current (A) | Trip current (A) | Rated voltage (V) | Withstand voltage (V) |
| --- | --- | --- | --- | --- |
| PPTC-2 | 0.08 A | 0.16 A | 250 V | 250 V |
| MOV-2 | — | — | 360 V Varistor voltage$^a$ | 595 V Clamping Voltage$^b$ |

— Not Applicable
$^a$determined at 1 mA
$^b$determined at a test pulse waveform (tp) = 8/20 μs and a test pulse current (IP) = 2.5 A Comparative Examples 5 to 8 (CE5 to CE8)

The procedures and conditions in preparing the composite circuit protection devices of CE5 to CE8 were respectively similar to those of E5 to E8, except that the PPTC chip was not included in CE5 and CE6, and the MOV was not included in CE7 and CE8.

Examples 9 to 12 (E9 to E12)

The procedures and conditions in preparing the composite circuit protection devices of E9 to E12 were respectively similar to those of E5 to E8, except that the MOV used therein was purchased from Ceramate Technical Co., Ltd. (Model No: 20D511K) (abbreviated MOV-3), which has a varistor voltage of 510 V (determined at 1 mA), and a clamping voltage of 845 V (determined at $t_p$=8/20 μs and IP=100A)

Comparative Examples 9 to 12 (CE9 to CE12)

The procedures and conditions in preparing the composite circuit protection devices of CE9 to CE12 were respectively similar to those of CE9 to CE12, except that the PPTC chip was not included in CE9 and CE10, and the MOV was not included in CE11 and CE12.

For simplicity, the structure of the composite circuit protection devices of E1 to E12 and CE1 to CE12 are summarized in Table 3, where V is an indicator for existence.

TABLE 3

| | Composite circuit protection device | | | | | |
| --- | --- | --- | --- | --- | --- | --- |
| | PPTC chip | | First through hole | MOV | | Second through hole |
| E1 | PPTC-1 | V | | MOV-1 | V | |
| E2 | | V | V | | V | V |
| E3 | | V | | | V | V |
| E4 | | V | V | | V | |
| CE1 | | | | MOV-1 | V | |
| CE2 | | | | | V | V |
| CE3 | PPTC-1 | V | | | | |
| CE4 | | V | V | | | |
| E5 | PPTC-2 | V | | MOV-2 | V | |
| E6 | | V | V | | V | |
| E7 | | V | | | V | V |
| E8 | | V | V | | V | V |
| CE5 | | | | MOV-2 | V | |
| CE6 | | | | | V | V |
| CE7 | PPTC-2 | V | | | | |
| CE8 | | V | V | | | |
| E9 | PPTC-2 | V | | MOV-3 | V | |
| E10 | | V | V | | V | |
| E11 | | V | | | V | V |
| E12 | | V | V | | V | V |
| CE9 | | | | MOV-3 | V | |
| CE10 | | | | | V | V |
| CE11 | PPTC-2 | V | | | | |
| CE12 | | V | V | | | |

Performance Test

Surge Immunity Test

Ten composite circuit protection devices of each of E1 to E12 and CE1 to CE12, serving as test devices, were subjected to a surge immunity test.

For E1 to E4 and CE1 to CE4, the surge immunity test for each test device was conducted in the presence of a voltage that is greater than the varistor voltage of the MOV-1 (including 38 V and 44 V) and a current of 0.5 A or an over-current for the PPTC-1 (i.e., 10 A), by switching on for 60 seconds and then off. If both of the PPTC chip and the MOV were not burned out and damaged, the test device was determined to pass the surge immunity test, and the average of the time at which the PPTC chip of the test device tripped (i.e., trip time), if any, was recorded. If one of the PPTC chip and the MOV was burned out, the test device was determined as burned out, and the average of the time at which the PPTC chip or the MOV was burned out (i.e., burned-out time) was recorded. The results are shown in Table 4.

For E5 to E8 and CE5 to CE8, the surge immunity test for each test device was conducted similar as mentioned above, except that the applied voltage is greater than the varistor voltage of the MOV-2 (including 400 V and 500 V) and the applied current (i.e., 0.5 A or 10 A) is considered as an over-current for the PPTC-2. The results are shown in Table 5.

For E9 to E12 and CE9 to CE12, the surge immunity test for each test device was conducted similar as mentioned above, except that the applied voltage is greater than the varistor voltage of the MOV-3 (including 600 V and 700 V). The results are shown in Table 6.

TABLE 4

| | 38 V/0.5 A | | 38 V/10 A | | 44 V/0.5 A | | 44 V/10 A | |
|---|---|---|---|---|---|---|---|---|
| | Result | Time (s) | Result | Time (s) | Result | Time (s) | Result | Time (s) |
| E1 | Passed | 2.438 | Passed | 0.551 | Passed | 2.255 | Passed | 0.145 |
| E2 | Passed | 2.425 | Passed | 0.532 | Passed | 2.200 | Passed | 0.134 |
| E3 | Passed | 2.372 | Passed | 0.530 | Passed | 2.180 | Passed | 0.130 |
| E4 | Passed | 2.345 | Passed | 0.525 | Passed | 2.165 | Passed | 0.125 |
| CE1 | MOV Burned | 4.706 | MOV Burned | 2.264 | MOV Burned | 4.319 | MOV Burned | 1.033 |
| CE2 | MOV Burned | 4.432 | MOV Burned | 2.055 | MOV Burned | 3.887 | MOV Burned | 1.018 |

TABLE 4-continued

| | 38 V/0.5 A | | 38 V/10 A | | 44 V/0.5 A | | 44 V/10 A | |
|---|---|---|---|---|---|---|---|---|
| | Result | Time (s) | Result | Time (s) | Result | Time (s) | Result | Time (s) |
| CE3 | Passed | No trip | PPTC Burned | 0.922 | Passed | No trip | PPTC Burned | 0.922 |
| CE4 | Passed | No trip | PPTC Burned | 0.058 | Passed | No trip | PPTC Burned | 0.913 |

As shown in Table 4, the test devices of CE1 to CE2 containing only the MOV were burned out within 5 seconds under the over-current of 0.5 A and the over-voltage that is at least 1.4 times greater than the varistor voltage of the MOV (the MOV can generally withstand a voltage that is 1.2 times greater than the varistor voltage thereof), or burned out within 2.5 seconds under the over-current of 10 A and the over-voltage, and such damage cannot be repaired. In addition, the test devices of CE3 to CE4 containing only the PPTC-1 were burned out under the over-current of 10 A. In contrast, all of the test devices of E1 to E4 containing the combination of the PPTC-1 chip and the MOV-1 (where the rated voltage of the PPTC-1 is about 59% of that of the MOV-1 as determined at 1 mA) passed the surge immunity test without being burned out. Moreover, as compared to E1, formation of the hole in the PPTC chip and/or the MOV in E2 to E4 improves the heat transfer, which may further shorten the time period for the PPTC-1 chip to be tripped, and thus prevents the over-current from flowing through the MOV, thereby protecting the MOV of the test device from being burned out. In other words, in the test devices of E1 to E4, the PPTC-1 chip trips before the MOV burns out in the presence of an over-current and a voltage that is greater than the varistor voltage of the MOV.

TABLE 5

| | 400 V/0.5 A | | 400 V/10 A | | 500 V/0.5 A | | 500 V/10 A | |
|---|---|---|---|---|---|---|---|---|
| | Result | Time (s) | Result | Time (s) | Result | Time (s) | Result | Time (s) |
| E5 | Passed | 4.464 | Passed | 0.058 | Passed | 0.864 | Passed | 0.056 |
| E6 | Passed | 4.400 | Passed | 0.058 | Passed | 0.860 | Passed | 0.055 |
| E7 | Passed | 4.355 | Passed | 0.056 | Passed | 0.852 | Passed | 0.050 |
| E8 | Passed | 4.350 | Passed | 0.055 | Passed | 0.834 | Passed | 0.048 |
| CE5 | MOV Burned | 19.575 | MOV Burned | 1.396 | MOV Burned | 10.585 | MOV Burned | 0.463 |
| CE6 | MOV Burned | 19.422 | MOV Burned | 1.375 | MOV Burned | 10.440 | MOV Burned | 0.455 |
| CE7 | PPTC Burned | 0.113 | PPTC Burned | 0.060 | PPTC Burned | 0.105 | PPTC Burned | 0.058 |
| CE8 | PPTC Burned | 0.1100 | PPTC Burned | 0.058 | PPTC Burned | 0.102 | PPTC Burned | 0.385 |

Note:
For test device with result that is shown as passed, the time recorded refers to the time period for the PPTC chip to be tripped.
For test device with result that is shown as VRD burned, the time recorded refers to the time period for the MOV to be burned out.
For test device with result that is shown as PPTC burned, the time recorded refers to the time period for the PPTC chip to be burned out.

As shown in Table 5, the test devices of CE5 to CE6 containing only the MOV-2 were burned out within 20 seconds under the over-current of 0.5 A and the over-voltage that is greater than the varistor voltage of the MOV-2, or burned out within 1.5 seconds under the over-current of 10 A and the over-voltage, and such damage cannot be repaired. In addition, the test devices of CE7 to CE8 containing only the PPTC-2 were burned out under the over-current of 0.5 A and 10A. In contrast, all of the test devices of E5 to E8 containing the combination of the PPTC-2 chip and the MOV-2 (where the rated voltage of the PPTC-2 is about 69% of that of the MOV-2 as determined at 1 mA) passed the surge immunity test without being burned out. Moreover, as compared to E5, formation of the hole in the PPTC chip and/or the MOV in E6 to E8 improves the heat transfer, which may further shorten the time period for the PPTC-2 chip to be tripped, and thus prevents the over-current from flowing through the MOV, thereby protecting the MOV of the test device from being burned out. In other words, in the test devices of E5 to E8, the PPTC-2 chip trips before the MOV-2 burns out in the presence of an over-current and a voltage that is greater than the varistor voltage of the MOV.

TABLE 6

|  | 600 V/0.5 A | | 600 V/10 A | | 700 V/0.5 A | | 700 V/10 A | |
| --- | --- | --- | --- | --- | --- | --- | --- | --- |
|  | Result | Time (s) | Result | Time (s) | Result | Time (s) | Result | Time (s) |
| E9 | Passed | 1.244 | Passed | 0.055 | Passed | 0.856 | Passed | 0.050 |
| E10 | Passed | 1.230 | Passed | 0.054 | Passed | 0.845 | Passed | 0.048 |
| E11 | Passed | 1.225 | Passed | 0.050 | Passed | 0.834 | Passed | 0.046 |
| E12 | Passed | 1.198 | Passed | 0.047 | Passed | 0.827 | Passed | 0.045 |
| CE9 | MOV Burned | 17.881 | MOV Burned | 0.975 | MOV Burned | 9.875 | MOV Burned | 0.385 |
| CE10 | MOV Burned | 17.650 | MOV Burned | 0.968 | MOV Burned | 9.762 | MOV Burned | 0.376 |
| CE11 | PPTC Burned | 0.1000 | PPTC Burned | 0.058 | PPTC Burned | 0.098 | PPTC Burned | 0.055 |
| CE12 | PPTC Burned | 0.9850 | PPTC Burned | 0.056 | PPTC Burned | 0.095 | PPTC Burned | 0.054 |

Note:
For test device with result that is shown as passed, the time recorded refers to the time period for the PPTC chip to be tripped.
For test device with result that is shown as VRD burned, the time recorded refers to the time period for the MOV to be burned out.
For test device with result that is shown as PPTC burned, the time recorded refers to the time period for the PPTC chip to be burned out.

As shown in Table 6, the test devices of CE9 to CE10 containing only the MOV-3 were burned out within 18 seconds under the over-current of 0.5 A and the over-voltage that is greater than the varistor voltage of the MOV-3, or burned out within 1 seconds under the over-current of 10 A and the over-voltage, and such damage cannot be repaired. In addition, the test devices of CE11 to CE12 containing only the PPTC-2 were burned out under the over-current of 0.5 A and 10A. In contrast, all of the test devices of E9 to E12 containing the combination of the PPTC-2 chip and the MOV-3 (where the rated voltage of the PPTC-2 is about 49% of that of the MOV-3 as determined at 1 mA) passed the surge immunity test without being burned out. Moreover, as compared to E9, formation of the hole in the PPTC chip and/or the MOV in E10 to E12 improves the heat transfer, which may further shorten the time period for the PPTC-2 chip to be tripped, and thus prevents the over-current from flowing through the MOV, thereby protecting the MOV of the test device from being burned out. In other words, in the test devices of E9 to E12, the PPTC-2 chip trips before the MOV-3 burns out in the presence of an over-current and a voltage that is greater than the varistor voltage of the MOV.

In conclusion, with the inclusion of the PTC component having the desired rated voltage (such as 45% to 70% of the varistor voltage of the voltage-dependent resistor as determined at 1 mA), the PTC component, which may quickly trip to a high-resistance state in the presence an over-current and an over-voltage, is capable of protecting the voltage-dependent resistor from being burned out by the over-current, and thus the composite circuit protection device of this disclosure may be repeatedly used without being damaged, which demonstrates its excellent endurability and reliability.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A composite circuit protection device, comprising:
    a positive temperature coefficient (PTC) component that includes
        a positive temperature coefficient (PTC) layer having two opposite surfaces, and
        first and second electrode layers respectively disposed on said two opposite surfaces of said PTC layer;
    a voltage-dependent resistor that is connected to said second electrode layer of said PTC component and that is formed with a second hole;
    a first conductive lead that is bonded to said first electrode layer of said PTC component; and
    a second conductive lead that is bonded to said voltage-dependent resistor,
    wherein said PTC component is formed with a first hole that is formed in said PTC layer, and has a rated voltage that ranges between 40% and 200% of a varistor voltage of said voltage-dependent resistor as determined at 1 mA.

2. The composite circuit protection device of claim 1, wherein said PTC component has the rated voltage that ranges between 45% and 100% of the varistor voltage of said voltage-dependent resistor as determined at 1 mA.

3. The composite circuit protection device of claim 1, wherein said PTC component has the rated voltage that ranges between 45% and 70% of the varistor voltage of said voltage-dependent resistor as determined at 1 mA.

4. The composite circuit protection device of claim 1, wherein said PTC component trips before said voltage-dependent resistor burns out in the presence of an over-current and a voltage that is greater than said varistor voltage of said voltage-dependent resistor.

5. The composite circuit protection device of claim 4, wherein said PTC component trips within $10^{-6}$ seconds to 100 seconds in the presence of the over-current that is greater than 0.1 A and a voltage that is greater than said varistor voltage of said voltage-dependent resistor.

6. The composite circuit protection device of claim 4, wherein said PTC component trips within $10^{-3}$ seconds to 10 seconds in the presence of the over-current that is greater than 0.5 A and a voltage that is greater than said varistor voltage of said voltage-dependent resistor.

7. The composite circuit protection device of claim 4, wherein said PTC component trips within $10^{-3}$ seconds to 1 second in the presence of the over-current that is greater than 10 A and a voltage that is greater than said varistor voltage of said voltage-dependent resistor.

8. The composite circuit protection device of claim 1, wherein said PTC layer of said PTC component has a peripheral edge defining a boundary of said PTC layer and interconnecting said two opposite surfaces of said PTC layer, said first hole being spaced apart from said peripheral edge of said PTC layer.

9. The composite circuit protection device of claim 1, wherein said first hole extends through at least one of said two opposite surfaces of said PTC layer.

10. The composite circuit protection device of claim 9, wherein said first hole further extends through at least one of the first and second electrode layers.

11. The composite circuit protection device of claim 1, wherein said voltage-dependent resistor includes
a voltage-dependent resistor layer having two opposite surfaces,
a third electrode layer disposed on one of said two opposite surfaces of said voltage-dependent resistor layer and connected to said second electrode layer of said PTC component, and
a fourth electrode layer disposed on the other one of said two opposite surfaces of said voltage-dependent resistor layer,
wherein said second conductive lead is bonded to one of said third and fourth electrode layers of said voltage-dependent resistor.

12. The composite circuit protection device of claim 11, further comprising a third conductive lead, said second conductive lead bonded to said fourth electrode layer, said third conductive lead bonded to and disposed between said second and third electrode layers.

13. The composite circuit protection device of claim 11, wherein said second hole is formed in the voltage-dependent resistor layer.

14. The composite circuit protection device of claim 13, wherein said voltage-dependent resistor layer of said voltage-dependent resistor has a peripheral edge defining a boundary of said voltage-dependent resistor layer and interconnecting said two opposite surfaces of said voltage-dependent resistor layer, said second hole being spaced apart from said peripheral edge of said voltage-dependent resistor layer.

15. The composite circuit protection device of claim 13, wherein said second hole extends through at least one of said two opposite surfaces of said voltage-dependent resistor layer.

16. The composite circuit protection device of claim 15, wherein said second hole further extends through at least one of said third and fourth electrode layers.

17. The composite circuit protection device of claim 1, wherein said PTC component is a polymer positive temperature coefficient (PPTC) component, and said PTC layer is a PTC polymeric layer.

18. The composite circuit protection device of claim 1, further comprising an encapsulant enclosing said PTC component, said voltage-dependent resistor, and a part of said first conductive lead and a part of said second conductive lead.

19. A composite circuit protection device, comprising:
a positive temperature coefficient (PTC) component that includes
a positive temperature coefficient (PTC) layer having two opposite surfaces, and
first and second electrode layers respectively disposed on said two opposite surfaces of said PTC layer;
a voltage-dependent resistor that is connected to said second electrode layer of said PTC component and that includes
a voltage-dependent resistor layer having two opposite surfaces,
a third electrode layer disposed on one of said two opposite surfaces of said voltage-dependent resistor layer and connected to said second electrode layer of said PTC component, and
a fourth electrode layer disposed on the other one of said two opposite surfaces of said voltage-dependent resistor layer;
a first conductive lead that is bonded to said first electrode layer of said PTC component; and
a second conductive lead that is bonded to one of said third and fourth electrode layers of said voltage-dependent resistor,
wherein said PTC component has a rated voltage that ranges between 40% and 200% of a varistor voltage of said voltage-dependent resistor as determined at 1 mA, and
wherein said voltage-dependent resistor is formed with a second hole that is formed in the voltage-dependent resistor layer.

* * * * *